July 4, 1939. W. THOMAS 2,164,669
RELIEF VALVE FOR POWER TRANSMISSION SYSTEMS
Filed Nov. 27, 1936
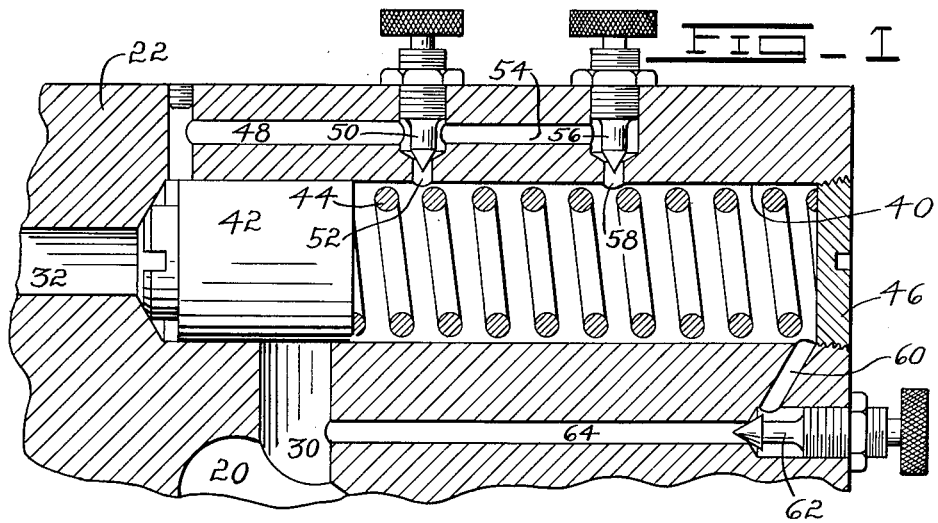
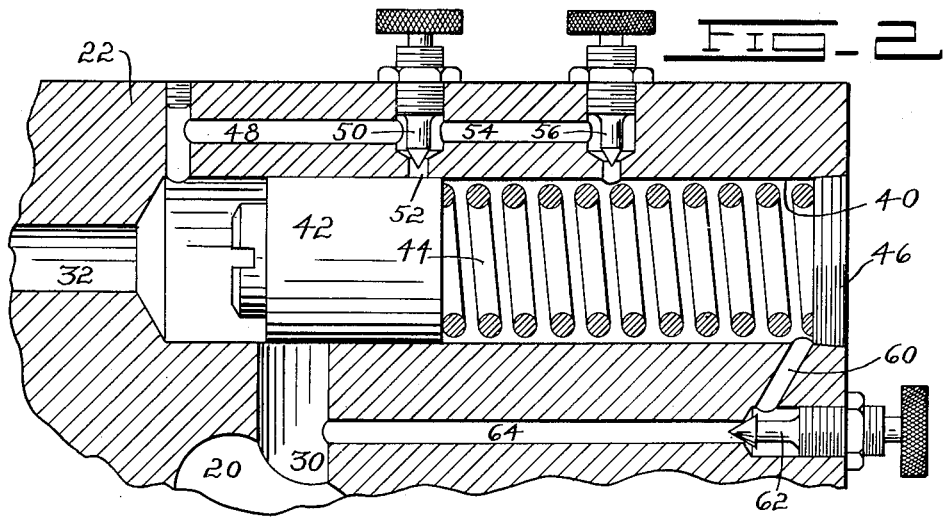
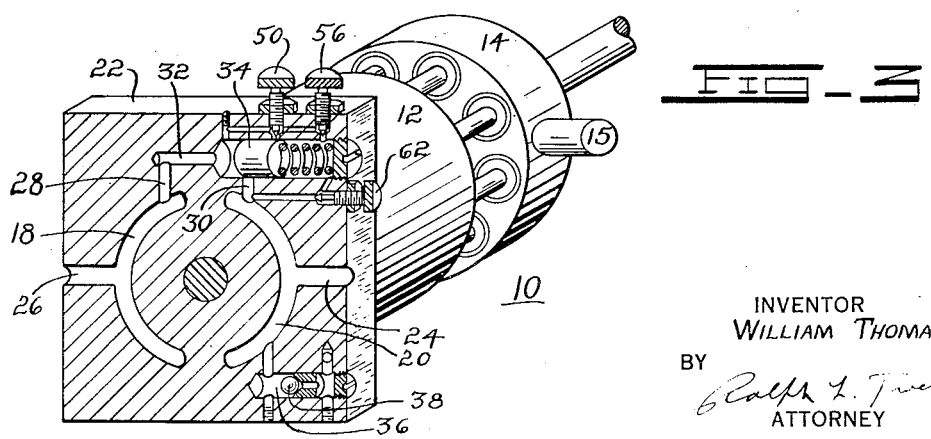
INVENTOR
WILLIAM THOMAS
BY
ATTORNEY Patented July 4, 1939

2,164,669

UNITED STATES PATENT OFFICE 2,164,669

RELIEF VALVE FOR POWER TRANSMISSION SYSTEMS

William Thomas, Waterbury, Conn., assignor to The Waterbury Tool Company, Waterbury, Conn., a corporation of Connecticut Application November 27, 1936, Serial No. 112,907

10 Claims. (Cl. 137—53)

This invention relates to power transmission systems, particularly to those of the type comprising two or more fluid pressure energy translating devices one of which may function as a pump and another as a fluid motor. In transmission systems of this character it is necessary to provide means for limiting the pressure developed in the high pressure side of the system and for this purpose a spring-loaded relief valve is customarily employed. In transmission systems operating at high pressures, say of the order of two thousand pounds per square inch, it is necessary if the valve is of the size to carry the full pump discharge, either to employ an excessively large heavy spring or to provide means for partially balancing the fluid pressures acting on the valve member. It is also desirable that the relief valve have characteristics such that the pressure at which the valve closes is as little as possible below that at which the valve opens, while at the same time insuring that once the safe operating pressure is exceeded the valve will open with certainty to pass the required quantity of fluid.

It is an object of the present invention to provide in a power transmission system of the character described a pressure limiting means including a spring-loaded piston together with adjustable hydraulic loading means.

A further object is to provide in a power transmission system a relief valve of this character, the opening pressure of which may be varied at will by a simple hydraulic adjustment without requiring adjustment of the spring force.

It is also an object to provide in a power transmission system a valve of the character described wherein means is provided for varying the hydraulic loading of the valve when the valve begins to open thereby insuring positive opening of the valve.

Further objects and advantages of the present invention will be apparent from the following description, reference being had to the accompanying drawing wherein a preferred form of the present invention is clearly shown.

In the drawing:

Fig. 1 is a fragmentary cross section of a power transmission device incorporating a preferred form of the present invention.

Fig. 2 is a view corresponding to Fig. 1 showing the parts in a different position.

Fig. 3 is a diagrammatic view of a power transmission device showing the location and connections of the relief valve mechanism relative to the other parts of the power transmission.

In the form of the invention illustrated in the drawing a fluid pressure energy translating device 10 may be of any suitable construction, and is illustrated as of the well-known "Waterbury" type, comprising a revolving cylinder barrel 12 having bores within which pistons are reciprocated through the medium of a socket ring and tilting box assembly 14. The assembly 14 is mounted for angular adjustment on transverse trunnions 16. Each of the cylinders of the barrel 12 has a port which alternately registers with an arcuate delivery port 18 and a corresponding arcuate section port 20 formed in a valve plate 22. Suction and discharge conduits 24 and 26 connect with the ports 20 and 18, respectively. The valve plate 22 is formed with a branch conduit 28 connecting with the port 18 and a branch conduit 30 connecting with the port 20. A transverse bore 32 connects the conduits 28 and 30 and with them forms a by-pass conduit connecting the ports 18 and 20. Within the bore 32 is mounted a relief valve 34, which is illustrated in detail in Figs. 1 and 2. The port 20 connects with a transverse bore 36 within which is located a ball check valve 38 forming a replenishing valve for the suction side of the device.

Referring now to Figs. 1 and 2, the bore 32 is provided with an enlarged portion 40 within which is reciprocably mounted a piston valve 42 normally lying in the position illustrated in Fig. 1 and closing communication between the conduits 30 and 32. A spring 44 resiliently urges the piston 42 to the left. The right-hand end of the bore 40 is closed by an end cap 46. In order to provide hydraulic means for assisting the spring 44 in holding the piston 42 in closed position, a by-pass path is provided which includes as an intermediate portion, the bore 40. This by-pass comprises a conduit 48 communicating with conduit 32 and having a needle valve 50 forming an adjustable restriction prior to entering the bore 40 at an opening 52. The opening 52 is so positioned that the right-hand edge of the piston 42 closes the opening 52 at approximately the same time that the left-hand end of the piston 42 begins to uncover the conduit 30.

An extension 54 of conduit 48 leads to a second needle valve 56 forming a second adjustable restriction leading to the bore 40 through an opening 58. The opening 58 is so positioned as to be clear of the piston 42 in all positions thereof. Beyond the bore 40 the by-pass path includes a conduit 60 leading to a third needle valve 62 forming an adjustable restriction for fluid leaving the bore 40. A conduit 64 connects the discharge from the needle valve 62 with the port 30 which is, of course, a point of low pressure.

It will be seen that the piston valve 42 is subject on its left-hand face to the fluid pressure existing in port 18 and conduits 28 and 32, which is the operating pressure of the power transmission system. This fluid pressure exerts a force tending to move the piston 42 to the right. Counteracting this force are two forces; the first being that of the spring 44 and the second being that of the fluid pressure in bore 40. The value of this pressure is determined by the settings of the needle valves 50, 56 and 62. It will be seen that in flowing through the by-pass path, the fluid encounters two pressure drops, the total magnitude of which is equal to the difference between the pressure in conduit 32 and that in conduit 30. The first pressure drop is that occurring through the two needle valves 50 and 56 which are in parallel, and the second pressure drop is that occurring at the needle valve 62.

So long as the operating pressure of the transmission system is below the value at which the force of the spring 44 plus the fluid pressure force in bore 40 can be overcome, the valve will remain in the position of Fig. 1. Whenever the operating pressure rises above this value, the piston 42 moves to the right into a position such as that illustrated in Fig. 2. In so doing the opening 52 is cut off so that the pressure in bore 40 is decreased since the first pressure drop is now larger, the by-pass fluid having only the needle valve 56 through which to flow into the bore 40. Thus, as soon as the valve begins to open, the hydraulic bias tending to close the valve is decreased permitting a wider opening. As soon as the operating pressure drops to a value sufficiently low so that the spring force plus the decreased hydraulic bias force is able to move the valve 42 to the left, the valve closes and in so doing opens the opening 52 thus increasing the hydraulic bias and moving the valve fully closed. It will be seen that the three needle valves 50, 56 and 62 provide means for adjusting the pressure at which the valve opens without varying the force of the spring 44 and also provide means for independently varying the opening and closing pressures of the valve. Thus with a given setting of the three needle valves, if it is desired to increase the opening pressure without changing the closing pressure, the valve 50 may be slightly opened. This will serve to increase the hydraulic bias which is effective prior to valve opening without effecting the hydraulic bias which is effective after valve opening. Likewise, if it is desired to increase the closing pressure without changing the opening pressure, the valve 56 may be opened and the valve 50 closed a corresponding amount.

The valve 62 is in the nature of a semi-permanent or factory adjustment and preferably may be used only for locating the normal range of field adjustment which is secured by the needle valves 50 and 56 and for insuring that an adjustment is reached such that a minimum quantity of fluid is shunted through the by-pass path. Obviously the needle valve 62 may be replaced by a fixed restriction if a wide range of operating pressure adjustments is not required. Likewise either or both of the needle valves 50 and 56 may be replaced by fixed restrictions if adjustability is not necessary.

While the form of embodiment of the invention as herein disclosed, constitutes a preferred form, it is to be understood that other forms might be adopted, all coming within the scope of the claims which follow.

What is claimed is as follows:

1. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on said valve in a direction tending to close the valve, said by-pass having a restricted portion on each side of said intermediate portion, and resilient means tending to hold the valve in closed position, said by-pass being constantly open whenever the valve is closed, the fluid pressure in the intermediate portion and the resilient means together acting to permit opening of the valve at a predetermined pressure differential between said conduits.

2. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on a predetermined area of said valve in a direction tending to close the valve but exerting less total force than the fluid in the first conduit, said by-pass having a constantly open restricted portion between the intermediate portion and the low pressure side of the device, and resilient means tending to hold the valve in closed position, the fluid pressure in the intermediate portion and the resilient means together acting to permit opening of the valve at a predetermined pressure differential between said conduits.

3. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on said valve in a direction tending to close the valve, said by-pass having an opening for fluid entering the intermediate portion and so located as to be closed by the piston valve when the latter moves to an open position, said by-pass having a constantly open restricted portion on each side of said intermediate portion, and resilient means tending to hold the valve in closed position.

4. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on a predetermined area of said valve in a direction tending to close the valve but exerting less total force than the fluid in the first conduit, said by-pass having an opening for fluid entering the intermediate portion and so located as to be closed by the piston valve when the latter moves to an open position, said by-pass having a restricted portion between the intermediate portion and the low pressure side of the device, and resilient means tending to hold the valve in closed position, said by-pass being constantly open whenever the valve is closed.

5. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on said valve in a direction tending to close the valve, said by-pass having an opening for fluid entering the intermediate portion and so located as to be closed by the piston valve when the latter moves to an open position, said by-pass having a second opening for fluid entering the intermediate portion and so located as to be open at all positions of the piston valve, said by-pass having a constantly open restricted portion for fluid leaving said intermediate portion, and resilient means tending to hold the valve in closed position.

6. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on a predetermined area of said valve in a direction tending to close the valve but exerting less total force than the fluid in the first conduit, said by-pass having an opening for fluid entering the intermediate portion and so located as to be closed by the piston valve when the latter moves to an open position, said by-pass having a second opening for fluid entering the intermediate portion and so located as to be open at all positions of the piston valve, said by-pass having a restricted portion between the intermediate portion and the low pressure side of the device, and resilient means tending to hold the valve in closed position, said by-pass being constantly open whenever the valve is closed.

7. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on said valve in a direction tending to close the valve, said by-pass having an adjustable restricted portion on each side of said intermediate portion, and resilient means tending to hold the valve in closed position, said by-pass being constantly open whenever the valve is closed, the fluid pressure in the intermediate portion and the resilient means together acting to permit opening of the valve at a predetermined pressure differential between said conduits.

8. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a small by-pass path around the valve having an intermediate portion for containing fluid effective on a predetermined area of said valve in a direction tending to close the valve but exerting less total force than the fluid in the first conduit, said by-pass having an adjustable restricted portion between the intermediate portion and the low pressure side of the device, and resilient means tending to hold the valve in closed position, said by-pass being constantly open whenever the valve is closed, the fluid pressure in the intermediate portion and the resilient means together acting to permit opening of the valve at a predetermined pressure differential between said conduits.

9. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a cylinder one end of which is closed by the piston valve, means forming a by-pass path from the first to the second conduit which is constantly open when the piston valve is closed, said by-pass communicating with said cylinder and being restricted so as to provide a pressure drop characteristic such that the pressure effective in said cylinder rises less than the pressure in the first conduit when the latter pressure rises whereby the oppositely acting fluid pressure forces on said piston valve are equal only at a predetermined pressure in said first conduit.

10. In a fluid pressure device having a pressure conduit, means forming a conduit through which pressure fluid may be relieved to a point of lower pressure, a piston valve normally closing said last conduit and subject to the pressure in the first conduit acting in a direction tending to open the valve, means forming a cylinder one end of which is closed by the piston valve, means forming a by-pass path from the first to the second conduit which is constantly open when the piston valve is closed, said by-pass communicating with said cylinder and being restricted so as to provide a pressure drop characteristic such that the pressure effective in said cylinder rises less than the pressure in the first conduit when the latter pressure rises whereby the oppositely acting fluid pressure forces on said piston valve are equal only at a predetermined pressure in said first conduit, and means responsive to opening movement of said valve for changing the pressure drop characteristics of said by-pass.

WILLIAM THOMAS.